US010286758B2

(12) United States Patent
Seel et al.

(10) Patent No.: US 10,286,758 B2
(45) Date of Patent: May 14, 2019

(54) DRIVE DEVICE FOR SHADE

(71) Applicant: Macauto Industrical Co., Ltd., Tainan (TW)

(72) Inventors: Holger Seel, Wuppertal (DE); Sven-Oliver Seel, Wuppertal (DE)

(73) Assignee: Macauto Industrical Co., Ltd., Yongkang District, Tainan (TW)

( * ) Notice: Subject to any disclaimer, the term of this patent is extended or adjusted under 35 U.S.C. 154(b) by 108 days.

(21) Appl. No.: 15/613,224

(22) Filed: Jun. 4, 2017

(65) Prior Publication Data

US 2017/0361686 A1    Dec. 21, 2017

(30) Foreign Application Priority Data

Jun. 17, 2016   (DE) .................. 10 2016 111 168

(51) Int. Cl.
*B60J 1/00*       (2006.01)
*B60J 1/20*       (2006.01)
*F16H 19/06*      (2006.01)

(52) U.S. Cl.
CPC ........... *B60J 1/2025* (2013.01); *B60J 1/2022* (2013.01); *B60J 1/2086* (2013.01); *F16H 19/06* (2013.01); *F16H 19/0622* (2013.01)

(58) Field of Classification Search
CPC ...... B60J 1/2025; B60J 1/2086; B60J 1/2083; F16H 19/06
USPC ........................................................ 74/89.2
See application file for complete search history.

(56) References Cited

U.S. PATENT DOCUMENTS

2003/0019591 A1*   1/2003  Christian .............. B60J 1/2011
                                                        160/89
2008/0017335 A1*   1/2008  Pohl ...................... B60J 1/17
                                                        160/370.22

FOREIGN PATENT DOCUMENTS

DE       102007031256 A1    2/2008
EP           1979182 B1    10/2008

* cited by examiner

Primary Examiner — Victor L MacArthur
(74) Attorney, Agent, or Firm — Von Rohrscheidt Patents

(57) ABSTRACT

A drive device for a shade arrangement for vehicles, in particular for a rear window or side window roller blind including a slider that is supported along a movement path and that supports a rod which rod facilitates moving the shade arrangement into a pulled out position or a pulled in position; a rope at which the slider is attached and which is run over an upper deflection arrangement proximal to the pulled out position and a lower deflection arrangement remote from the pulled out position; a drive roller at which the rope is at least attached by friction locking; and a drive motor which rotates the drive roller and moves the slider by the rope between the pulled out position and the pulled in position, wherein the lower deflection arrangement and the upper deflection arrangement are configured without a drive, and wherein the drive motor with the associated drive roller is arranged between the upper deflection arrangement and the lower deflection arrangement.

9 Claims, 3 Drawing Sheets

DRIVE DEVICE FOR SHADE

RELATED APPLICATIONS

This application claims priority from and incorporates by reference German Patent Application DE 10 2016 111 168.6 filed on Jun. 17, 2016.

BACKGROUND OF THE INVENTION

The invention relates to a drive device for a shade arrangement for vehicles, in particular for a rear window or side window roller blind including a slider that is supported along a movement path, the slider supporting a rod which facilitates moving the shade arrangement into a pulled out position and/or a pulled in position, including a rope at which the slider is attached and which is run over an upper deflection arrangement proximal to the pulled out position and a lower deflection arrangement remote from the pull out position, a drive roller at which the rope is at least attached by friction locking, a motor which rotates the drive roller and moves the slider by the rope between the pulled out position and the pulled in position.

Drive devices for shade arrangements are known in many configurations.

A drive device of this generic type is illustrated e, g. EP 1 979 182 B1 which moves a slider within a support tube back and forth between a pulled out position and a pulled in position. In this drive device the upper deflection arrangement that is proximal to the pulled out position is configured as a drive roller. The rod inserted into the slider is coupled with a pull out profile of the sun roller blind. When the slider is moved into the starting position, then the rod takes the pull out profile of the sun roll up blind along and thus moves the sun roll up blind into its shading pulled out position. An opposite movement retracts the sun roll up blind.

DE 10 2016 100 208 also owned by applicant and not yet published shows a drive device of the generic type cited supra. Also this drive device includes an upper deflection arrangement and a lower deflection arrangement wherein both deflection arrangements are configured as a roller. The lower deflection arrangement is configured as a drive roller which moves the rope back and forth, and consequently moves the slider back and for the between the pulled out position and the pulled in position.

The known drive devices like many other technical arrangements of vehicles are typically hidden between inner fairing elements so that cavities between the inner fairing elements and a vehicle body are the only place available for arrangement. Since a variety and number of pieces of equipment of modern vehicles has increased continuously a plurality of technical pieces of equipment shares the limited installation spaces. Behind door fairings of vehicle doors there are for example speakers, body stiffeners components of electrical window lifters, support elements for movable side windows, actuation motors for electrical locking doors, air bag components and shade devices and their control and drive elements. This installation space is further limited by indentations of the side fairings into the arrangement space in order to provide room for storage compartments in the interior. In order to use the limited installation space in the best way possible the pieces of equipment have to be minimized with respect to their installation space requirements. This minimization of installation requirement was achieved in the past in particular by minimizing electrical and electronic components.

BRIEF SUMMARY OF THE INVENTION

Thus, it is an object of the invention to achieve further installation space minimization for drive devices of the generic type recited supra.

The object is achieved by a drive device for a shade arrangement for vehicles, in particular for a rear window or side window roller blind including a slider that is supported along a movement path and that supports a rod which rod facilitates moving the shade arrangement into a pulled out position or a pulled in position; a rope at which the slider is attached and which is run over an upper deflection arrangement proximal to the pulled out position and a lower deflection arrangement remote from the pulled out position; a drive roller at which the rope is at least attached by friction locking; and a drive motor which rotates the drive roller and moves the slider by the rope between the pulled out position and the pulled in position, wherein the lower deflection arrangement and the upper deflection arrangement are configured without a drive, and wherein the drive motor with the associated drive roller is arranged between the upper deflection arrangement and the lower deflection arrangement.

In the art it was considered advantageous to configure the upper or the lower deflection arrangement as a drive roller in order to keep a number of components low. Instead of further minimizing the number of components the invention initially adds an additional component. In addition to the drive roller now an upper deflection arrangement without a drive and a lower deflection arrangement without a drive are provided. Thus, the invention departs from the regular path of installation space minimization by reducing the number of components and adds supplemental components instead.

Decoupling the drive roller from the deflection arrangements facilitates freely positioning the motor between the upper deflection arrangement and the lower deflection arrangement wherein this applies with respect to the spatial arrangement between the deflection arrangements and alternatively also to an arrangement only relating to a rope support. Separating the deflection arrangement and the drive roller initially generates more freedom for arranging the components of the drive device within a predetermined arrangement space.

In particular when the drive roller is arranged outside of the movement path of the slider, advantageously when it is arranged laterally from the movement path of the slider separating the drive roller and the deflection arrangement has another essential advantage. For an identical stroke movement of the drive device according to the invention and a prior art drive device the drive device according to the invention can be shortened with respect to a length that is measured along the movement path of the slider. Alternatively the stroke can be increased for a device length that is measured in a direction of the movement path.

Thus the invention does not only implement greater flexibility for arranging the motor of the drive device by adding additional components but the invention also provides a pre-condition for reducing installation space requirement.

It is furthermore provided that the rope is slung about the drive roller and a rope entry portion of the drive roller is in one plane with the rope exit portion of the drive roller, in particular when the plane is parallel to a rotation axis of the drive roller and in particular transversal to the movement path of the slider.

It is furthermore envisioned that spacers are provided which arrange the upper and lower deflection arrangement with an offset from each other and combine it into a module unit.

Thus, it is provided that the spacer device is a support tube and/or a dust cover.

It is advantageously provided that the upper and lower deflection arrangement respectively includes a housing which is provided with coupling devices for arranging the spacer. This way the two housings are combined with each other to form a mounting unit.

Similar to embodiments known in the art it is thus assured that the drive device can be delivered to a car manufacturer as a sub assembly. Providing the spacer device as a dust cover and/or support tube assures a safe function of the drive device according to the invention.

The coupling devices which are formed by the housings of the upper and lower deflection arrangement facilitate a very simple adaptation of the drive device to different requirements with respect to the lift movement. When the slider has to cover a large stroke to actuate the roll up sun blind an accordingly longer spacer, an accordingly longer dust cover is used. A shorter stroke is implemented by using a shorter dust cover as a spacer.

In another embodiment the lower deflection arrangement can form a unit together with the drive and the drive roller. In this case the housing of the unit is provided with an accordingly configured coupling arrangement.

However, it is also conceivable that the drive roller including the motor has a separate housing and a first coupling device is arranged between the upper deflection arrangement and the drive housing and a second coupling device is arranged between the drive housing and the lower deflection arrangement. Varying a length of the spacers facilitates freely selecting a position of the drive housing with the drive roller and the motor. Furthermore the drive is provided as a fixed component of a mounting unit.

BRIEF DESCRIPTION OF THE DRAWINGS

The invention is now described based on an embodiment with reference to drawing figures, wherein.

DETAILED DESCRIPTION OF THE INVENTION

Figure 1:
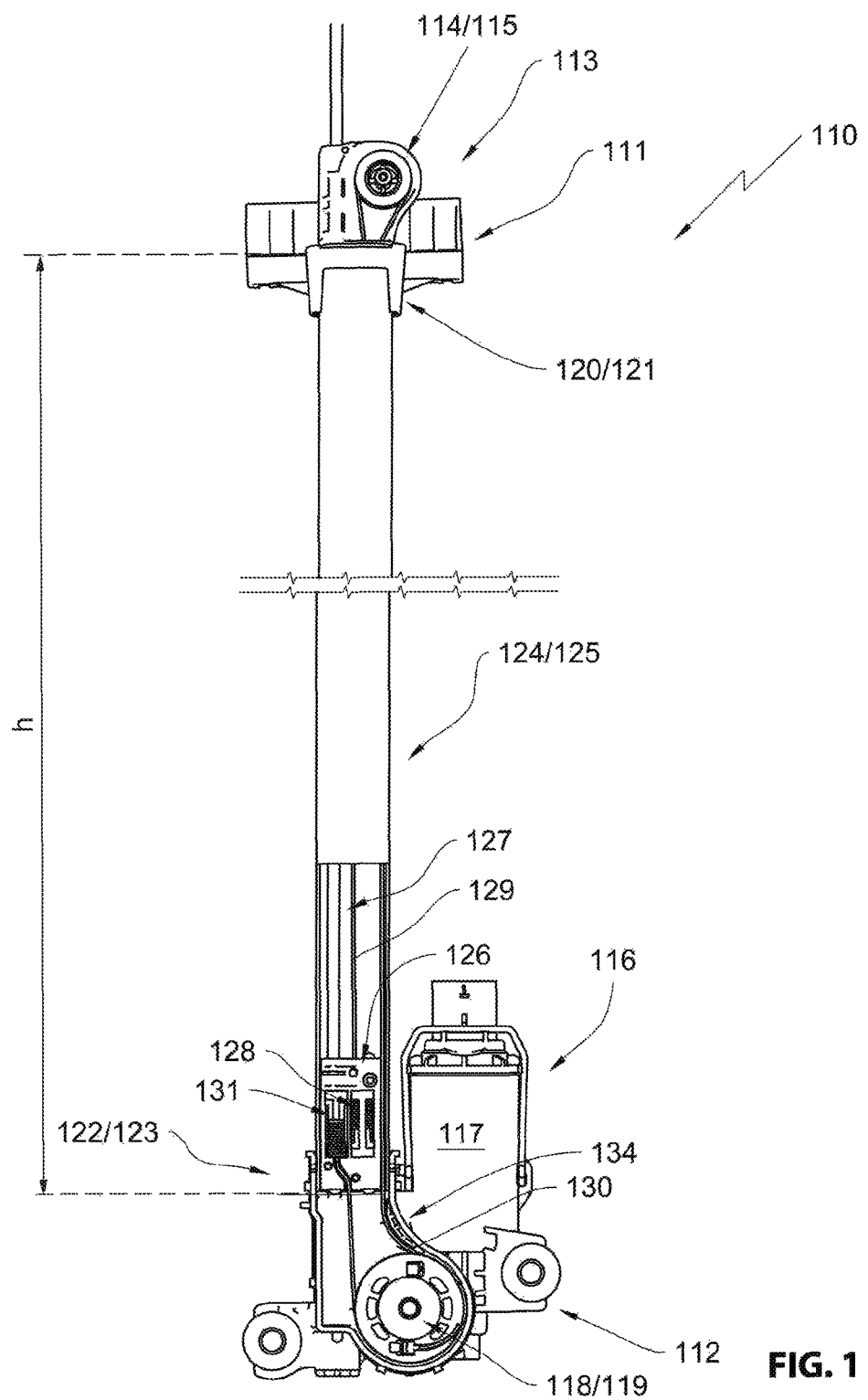
FIG. 1 illustrates a generic known drive device in a partial sectional view.

In the drawing figures a drive device according to the invention is overall designated with the reference numeral 10. The drive device illustrated in FIG. 1 that is known in the art is designated with the reference numeral 110.

As an introduction for the detailed description of the invention the prior art drive device 110 of FIG. 1 is now described. This drive device includes an upper attachment mount 111 and a lower attachment mount 112. The attachment mounts 111 and 112 are used for attaching the drive device 110 at a body component, for example a car door as schematically illustrated in FIG. 3.

The upper attachment mount 111 is an integral part of a first housing element 113 which supports an upper deflection arrangement 114 configured as a roller 115. The lower attachment mount 112 is part of a second housing element 116. The second housing element 116 includes a drive 117 with an electric motor and a drive motor 118 which forms a lower deflection arrangement 119. The first housing element 113 forms a first coupling arrangement 112 configured as a receiving spout 121, the second coupling arrangement 122 which is also configured as a receiving spout 123 is provided by the second housing element 116. Between the first housing element 113 and the second housing element 116 a spacer 124 configured as a guide tube 125 or a dust cover 125 is arranged which connects the first housing element 113 and the second housing element 116 to form a module that provides the drive device 110.

A slider 126 is arranged within the support tube 125 wherein the slider moves up and down along a movement path extending between the lower deflection arrangement 119 and the upper deflection arrangement 114. The slider 126 supports a rod 127 and includes a first rope receiver 128. A first rope 129 comes out of the first rope receiver and runs to the upper deflection arrangement 114, wherein the rope is deflected over the upper roller 115 and run back into an opposite direction. The rope 129 runs within the guide tube 125 past the slider 126 and is attached at the drive roller 118. A second rope 130 is fixated in a second rope receiver 130 and run from there to the drive roller 118. There the rope is attached in a suitable manner and deflected by winding it onto and unwinding from the drive roller.

Figure 3:
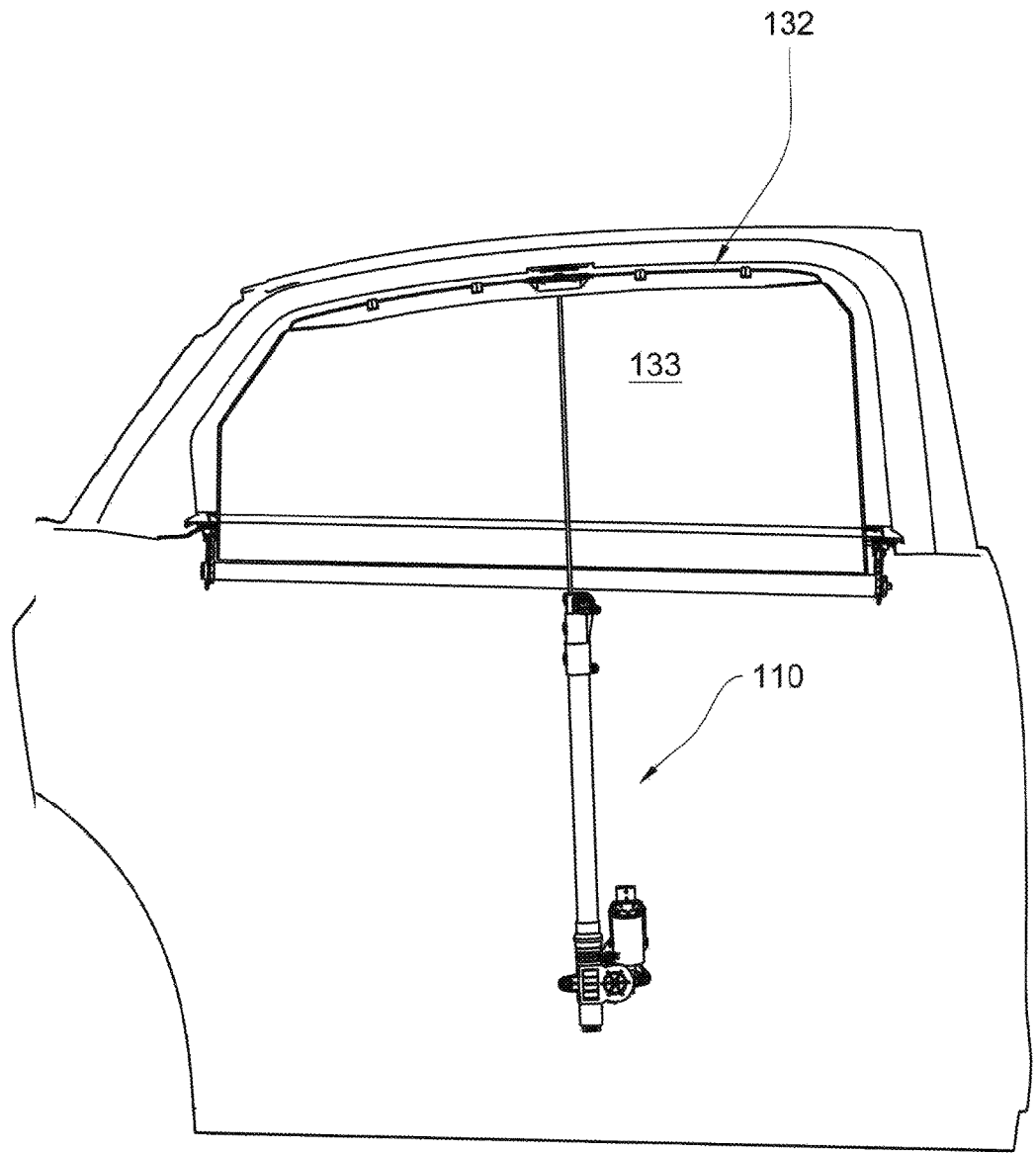
FIG. 3 illustrates a schematic view of an installed position of a generic drive device according to the invention at a vehicle door.

Corresponding to the schematic illustration in FIG. 3 the upper end of the rod is attached at a pull out profile 132 of a sun roll up blind 133. Rotating the drive roller 118 in FIG. 1 clockwise leads to winding up the first rope 129 while simultaneously unwinding the second rope 130. Thus, the first rope 129 that is deflected over the upper roller 115 pulls the slider 126 in an upward direction and moves the sun roll up blind 133 into its pulled out position. An opposite rotation of the drive roller 118 counter clock wise causes the second rope 130 to be wound onto the drive roller 118 while simultaneously unwinding the other rope 129. The slider 126 with the rod 127 attached thereto and the pull out profile 132 is moved downward. Thus, the sun roll up blind 133 is moved into its pulled in condition.

Figure 2:
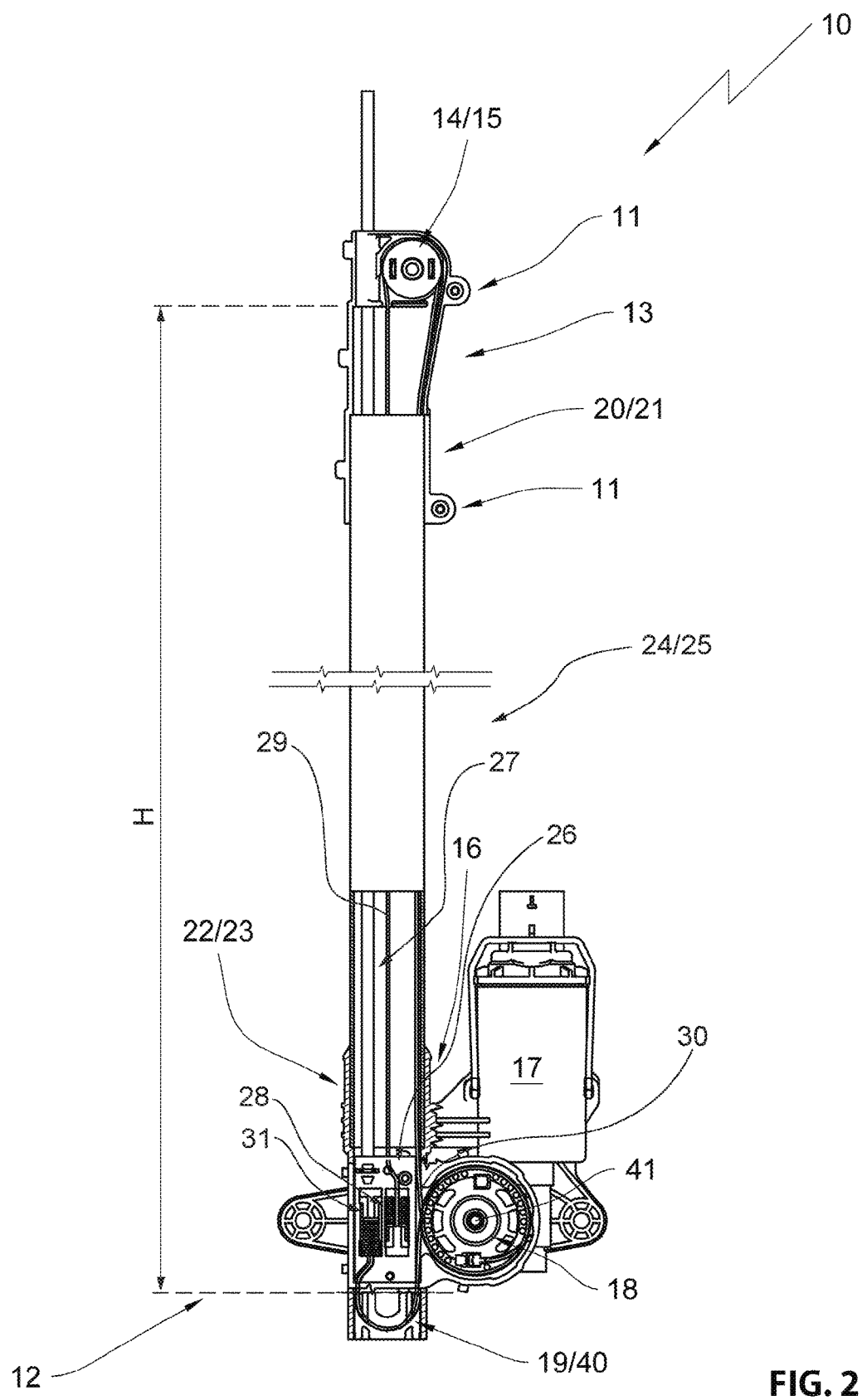
FIG. 2 illustrates a drive device according to the invention in a partial sectional view.

A drive device 10 according to the invention is illustrated in FIG. 2. With respect to configuration and function the drive device 10 according to the invention to some extent corresponds to the prior art and therefore related reference numerals are used for identical or equivalent components.

Also the drive device 10 according to the invention includes an upper attachment mount 11 and a lower attachment mount 12. The upper attachment mount 11 forms part of a first housing element 13. The first housing element 13 supports the upper deflection arrangement 14 configured as an upper roller 15.

The lower attachment mount 12 configured as part of the second housing element 16 includes a lower deflection arrangement 19. The lower deflection arrangement 19 can be configured as a roller. In the instant embodiment, however, the lower deflection arrangement is a sliding rail with a circumference angle of approximately 180°. Differently from the prior art the lower deflection arrangement 19 is not configured as a drive roller.

Also the drive device 10 according to the invention includes a first coupling device 20 configured as a first receiving spout 21 formed by the first housing element 13. The second coupling arrangement 22 is formed by the second receiving spout 23 which forms part of the second housing element 16. A support tube or a dust cover 25 is formed by the spacer 24 and is fixated in the first receiving spout 21 and the second receiving spout 23. Also according to the invention the support tube 25 is connected to the first housing element 13 with the second housing element 16 to form a module.

A slider 26 is arranged within the support tube 25 wherein the slide moves up and down along a movement path and extends between the upper deflection arrangement 14 and the lower deflection arrangement 19. Also there the slider 26 carries a rod 27 which is connected at its end oriented away from the slider 26 according to a schematic illustration provided in FIG. 3 in an installed condition of the drive device 10 wherein the rod is connected with the pull out profile 132 of a sun roll up blind 133. As described supra a first rope 29 is fixated in a first rope receiver 28 of the slider 26. The first rope 29 exits from the slider 26 in a direction towards an upper roller 15 and is deflected by the roller 15 so that it is run back in the opposite direction.

A second rope 30 is fixated in a second rope receiver 31 of the slider 26. The second rope 30 exits from the slider 26 in a direction towards the lower deflection arrangement 19 and is supported at this location in a direction towards the upper deflection arrangement 14.

As already stated supra the lower deflection arrangement 19 according to the invention is not configured as a drive roller, instead a drive roller 18 is arranged outside of the movement path of the slider 26, in particular adjacent to the movement path of the slider 26 and spatially supported between the deflection arrangements 14 and 19. In the same way also the electro motoric drive 17 of the drive device 10 according to the invention is arranged adjacent to the movement path of the slider 26 or laterally from the guide tube 25. Besides the spatial arrangement of the drive roller 18 and the drive 17 also decoupling the two components from the second housing element is conceivable. The drive 17 including the drive roller 18 can be arranged with respect to the rope support between the deflection arrangements 14 and 19 and thus can be mounted at a suitable location that is remote from the support tube 25.

From a comparison view of FIGS. 1 and 2 it is initially evident that the rope entry point of the respective ropes 29 and 30 coincides with a rope exit point of each rope 29, 30. Differently from the prior art the rope entry or exit points, however, are in a plane that is oriented orthogonal to a movement path of the slider 26 and arranged parallel to the drive roller axis 41. The return section 134 provided in the prior art which returns the first rope 129 in a direction towards the movement path of the slider and thus imparts an S-curve upon the slider is advantageously omitted. The S-curve in the portion of the drive roller that is imparted upon the rope in the prior art causes significant tension and bending forces that load the first rope 129. The decoupling of lower deflection arrangement 19 and drive roller 18 thus leads to reduced rope loading.

It is furthermore evident from a comparison view of FIGS. 1 and 2 that a movement path of the slider 26 extends into the portion of the drive roller 18 so that the slider 26 can be run past the drive roller 18. Contrary thereto the movement path of the slider 26 in the prior art terminates above the drive roller 118 since the drive roller 118 limits the movement path of the slider 126 in a downward direction. Thus, the invention facilitates to freely position the drive 17 including the drive roller 18 along the movement path 26 in an exemplary manner in the second housing element 16 and can be theoretically arranged in a separate housing at any place spatially between the deflections 14 and 19.

These high levels of freedom of arranging the drive 17 including the drive roller 18 facilitate arranging the drive 17/18 at a suitable location in an available receiving space for the drive device 10.

A substantial advantage of the invention is evident from comparing FIG. 1 and FIG. 2. Therein the drive device 10 according to the invention is compared with the prior art drive device 110. A stroke H of the drive device 10 according to the invention, thus a free movement travel of the slider 26 along is movement path between the deflection arrangements is 14 and 19 is thus identical with the stroke h of the drive device 110 according to the prior art. Also in the prior art the stoke h is defined by a free movement travel of the slider along its movement path between the deflection arrangements 14 and 19.

With identical stroke H, h the drive device 10 according to the invention is built much shorter than the prior art drive device 110. This is achieved by a lateral offset of the drive roller 18 next to the movement path of the slider 26 so that the slider 26 can move past the drive roller 18. Thus, for identical stroke H, h the invention facilitates a more compact drive device 10. Since the window cut outs of motor vehicle bodies partially become larger using the invention facilitates a greater stroke H with identical installed length as the prior art and is thus suitable for larger travel distances of the slider 26 and the rod 27 and thus of the sun shade roll up blind 133.

Separating the deflection arrangement 19 and the drive roller 18 into two separate components and an increase in number of components over the prior art the invention advantageously facilitates to build the drive device more compact with strokes H, h identical or increasing the stroke H for an identical length of the drive device 10 compared to the drive device 110. Decoupling the deflection arrangement 19 and the drive roller 18 furthermore facilitates to arrange the electro motoric drive 17 including the drive roller 28, not only spatially between the deflection arrangements 14 and 19 and thus to optionally shorten a length of the drive device 10 or to increase the stroke H. The drive device according to the invention also facilitates a spatial decoupling so that the drive 17, 18 can be arranged at an almost random alternative location. Last not least the invention facilitates that the S-curve of the rope in the portion of the drive roller 118 that is provided in the prior art can be avoided and thus rope loads through tension and bending forces are reduced.

As evident from FIGS. 1-3 the first rope 29 and the second rope 30 is divided into two sections by the respective upper deflection arrangement 14 or lower deflection arrangement 19. These sections are run within the support tube 25 parallel to the movement path of the slider 26 or parallel to each other.

REFERENCE NUMERALS AND DESIGNATIONS

Prior Art 110 drive device
111 upper attachment mount
112 lower attachment mount
113 first housing element
114 upper deflection arrangement
115 upper roller
116 second housing element
117 electric motor drive
118 drive roller
119 lower deflection arrangement
120 first coupling arrangement 121 first receiving spout
122 second coupling arrangement
123 second receiving spout
124 spacer
125 support tube/dust protector
126 slider
127 rod
128 first rope receiver
129 first rope
130 second rope
131 second rope receiver
132 pull out profile
133 sun roll up blind
134 return section Invention 10 drive device
11 upper attachment mount
12 lower attachment mount
13 first housing element
14 upper deflection arrangement
15 upper roller
16 second housing element
17 electric motor drive
18 drive roller
19 lower deflection arrangement
20 first coupling arrangement
21 first receiving spout
22 second coupling arrangement
23 second receiving spout
24 spacer
25 support tube/dust protector
26 slider
27 rod
28 first rope receiver
29 first rope
30 second rope
31 second rope receiver
40 sliding rail
41 drive roller axis
H stroke of 10
h stroke of 110

What is claimed is:

1. A drive device for a shade arrangement for vehicles, comprising:
a slider that is supported along a movement path and that supports a rod which rod facilitates moving the shade arrangement into a pulled out position or a pulled in position;
a rope at which the slider is attached and which is run over an upper deflection arrangement and a lower deflection arrangement;
a drive roller at which the rope is attached by friction locking; and
a drive motor which rotates the drive roller and moves the slider by the rope between the pulled out position and the pulled in position,
wherein the drive roller is arranged separate from the upper deflection arrangement and the lower deflection arrangement, and
wherein the rope is slung around the drive roller and a rope entry portion of the drive roller is arranged in one plane with a rope outlet portion of the drive roller.

2. The drive device according to claim 1, wherein the drive roller is arranged spatially between the upper deflection arrangement and the lower deflection arrangement.

3. The drive device according to claim 1, wherein the drive with the drive roller is arranged between the upper deflection arrangement and the lower deflection arrangement.

4. The drive device according to claim 1, wherein the drive roller is arranged laterally from a movement path of the slider.

5. The drive device according to claim 1, wherein the one plane is arranged parallel to the rotation axis and orthogonal to the movement path of the slider.

6. The drive device according to claim 1, wherein at least one spacer is provided which offsets the upper deflection arrangement and the lower deflection arrangement from each other and arranges the upper deflection arrangement at the lower deflection arrangement and combines them into a module.

7. The drive device according to claim 6, wherein the spacer is a guide tube or a dust cover.

8. The drive device according to claim 7,
wherein the rope within a support tube is parallel to a movement path of the slider or sections of the rope within the support tube are parallel to each other.

9. The drive device according to claim 6, wherein the upper deflection arrangement and the lower deflection arrangement respectively include a housing which is provided with coupling devices for arranging the spacer.

* * * * *